United States Patent
Grasso (10) Patent No.: US 12,124,116 B2
(45) Date of Patent: Oct. 22, 2024

(54) EYEWEAR WITH VARIABLE TRANSMISSION LENS

(71) Applicant: LUXOTTICA S.R.L., Belluno (IT)

(72) Inventor: Omar Grasso, Chivasso (IT)

(73) Assignee: LUXOTTICA S.R.L., Belluno (IT)

( * ) Notice: Subject to any disclaimer, the term of this patent is extended or adjusted under 35 U.S.C. 154(b) by 99 days.

(21) Appl. No.: 15/789,684

(22) Filed: Oct. 20, 2017

(65) Prior Publication Data

US 2019/0121164 A1  Apr. 25, 2019

(51) Int. Cl.
*G02C 7/10* (2006.01)

(52) U.S. Cl.
CPC ............. *G02C 7/102* (2013.01); *G02C 7/104* (2013.01); *G02C 7/108* (2013.01); *G02C 2202/16* (2013.01); *G02C 2202/18* (2013.01)

(58) Field of Classification Search
CPC ......... G02C 7/102; G02C 7/104; G02C 7/108
USPC .................................. 351/44, 159.61–159.62
See application file for complete search history.

(56) References Cited

U.S. PATENT DOCUMENTS

| | | |
|---|---|---|
| 2,219,122 A | 10/1940 | Weidert et al. |
| 3,269,267 A | 8/1966 | Collins |
| 3,377,626 A | 4/1968 | Smith |
| 3,432,220 A | 3/1969 | Schreiner |
| 3,591,864 A | 7/1971 | Allsop |
| 3,701,590 A | 10/1972 | Zeltzer |
| 3,877,797 A | 4/1975 | Thornton, Jr. |
| 4,018,965 A * | 4/1977 | Kerko ..................... C03C 21/00 351/159.61 |
| 4,168,113 A | 9/1979 | Chang et al. |
| 4,176,299 A | 11/1979 | Thornton, Jr. |
| 4,268,134 A | 5/1981 | Gulati et al. |
| 4,288,250 A | 9/1981 | Yamashita |
| 4,300,819 A | 11/1981 | Taylor |

(Continued)

FOREIGN PATENT DOCUMENTS

| | | |
|---|---|---|
| CN | 1338622 | 3/2002 |
| CN | 2859575 | 1/2007 |

(Continued)

OTHER PUBLICATIONS

Melles Griot Product Catalog, Melles Griot; p. 13.2; 1999. (Year: 1999).*

(Continued)

*Primary Examiner* — Zachary W Wilkes
(74) *Attorney, Agent, or Firm* — Sterne, Kessler, Goldstein & Fox P.L.L.C.

(57) ABSTRACT

A lens for sunglasses includes a convex front surface, functionally directed toward an item to be viewed, and a concave rear surface, functionally directed toward the eye of a person who is wearing the eyeglasses. The lens further includes a photochromatic layer, proximate to the front surface, and a screening layer defining a UV filter, proximate to the rear surface and arranged between the rear surface and the photochromatic layer. The photochromatic layer is in the range of wavelengths comprised between 380 nm and 780 nm and has a transmittance comprised between 10% and 60%, in an activated state thereof, and a wavelength comprised between 80% and 95%, in a deactivated state thereof. The screening layer has a transmittance lower than 0.5% in the range of wavelengths comprised between 280 nm and 400 nm.

20 Claims, 2 Drawing Sheets

(56) References Cited

U.S. PATENT DOCUMENTS

| | | | |
|---|---|---|---|
| 4,354,739 A | 10/1982 | Scanlon et al. | |
| 4,376,829 A | 3/1983 | Daiku | |
| 4,405,881 A | 9/1983 | Kobayashi | |
| 4,521,524 A | 6/1985 | Yamashita | |
| 4,537,612 A | 8/1985 | Borrelli et al. | |
| 4,571,748 A | 2/1986 | Carroll et al. | |
| 4,659,178 A | 4/1987 | Kyogoku | |
| 4,663,562 A | 5/1987 | Miller et al. | |
| 4,687,926 A | 8/1987 | Plummer | |
| 4,765,729 A | 8/1988 | Taniguchi | |
| 4,769,347 A | 9/1988 | Cook et al. | |
| 4,777,090 A | 10/1988 | Ovshinsky et al. | |
| 4,802,755 A | 2/1989 | Hensler | |
| 4,826,286 A | 5/1989 | Thornton, Jr. | |
| 4,838,673 A | 6/1989 | Richards et al. | |
| 4,859,039 A | 8/1989 | Okumura et al. | |
| 4,908,996 A | 3/1990 | Friedman et al. | |
| 4,998,817 A | 3/1991 | Zeltzer | |
| 5,039,631 A | 8/1991 | Krashkevich et al. | |
| 5,051,309 A | 9/1991 | Kawaki et al. | |
| RE33,729 E | 10/1991 | Perilloux | |
| 5,054,902 A | 10/1991 | King | |
| 5,061,659 A | 10/1991 | Ciolek et al. | |
| 5,073,423 A | 12/1991 | Johnson et al. | |
| 5,077,240 A | 12/1991 | Hayden et al. | |
| 5,121,030 A | 6/1992 | Schott | |
| 5,121,239 A | 6/1992 | Post | |
| 5,135,298 A | 8/1992 | Feltman | |
| 5,149,183 A | 9/1992 | Perrott et al. | |
| 5,164,858 A | 11/1992 | Aguilera, Jr. et al. | |
| 5,171,607 A | 12/1992 | Cumbo | |
| 5,190,896 A | 3/1993 | Pucilowski et al. | |
| 5,198,267 A | 3/1993 | Abaroni et al. | |
| 5,218,386 A | 6/1993 | Levien | |
| 5,306,746 A | 4/1994 | Ida et al. | |
| 5,353,148 A | 10/1994 | Eid et al. | |
| 5,364,498 A | 11/1994 | Chen | |
| 5,408,278 A | 4/1995 | Christman | |
| 5,434,707 A | 7/1995 | Dalzell et al. | |
| 5,438,024 A | 8/1995 | Bolton et al. | |
| 5,446,007 A | 8/1995 | Krashkevich et al. | |
| 5,471,036 A | 11/1995 | Sperbeck | |
| 5,513,038 A | 4/1996 | Abe | |
| 5,550,599 A | 8/1996 | Jannard | |
| 5,574,517 A | 11/1996 | Pang et al. | |
| 5,592,245 A | 1/1997 | Moore et al. | |
| 5,646,479 A | 7/1997 | Troxell | |
| 5,646,781 A | 7/1997 | Johnson, Jr. | |
| 5,658,502 A | 8/1997 | Hughes | |
| 5,668,618 A | 9/1997 | Simioni | |
| 5,694,240 A | 12/1997 | Sternbergh | |
| 5,702,813 A | 12/1997 | Muarata et al. | |
| 5,715,031 A | 2/1998 | Roffman et al. | |
| 5,724,187 A | 3/1998 | Varaprasad et al. | |
| 5,729,323 A | 3/1998 | Arden et al. | |
| 5,731,898 A | 3/1998 | Orzi et al. | |
| 5,751,481 A | 5/1998 | Dalzell et al. | |
| 5,774,202 A | 6/1998 | Abraham et al. | |
| 5,922,246 A | 7/1999 | Matsushita et al. | |
| 5,925,438 A | 7/1999 | Ota et al. | |
| 5,925,468 A | 7/1999 | Stewart | |
| 5,928,718 A | 7/1999 | Dillon | |
| 5,995,273 A | 11/1999 | Chandrasekhar | |
| 6,040,053 A | 3/2000 | Scholz et al. | |
| 6,045,224 A | 4/2000 | Kallenbach et al. | |
| 6,102,539 A | 8/2000 | Tucker | |
| 6,132,044 A | 10/2000 | Sternbergh | |
| 6,135,595 A | 10/2000 | Takeshita et al. | |
| 6,138,286 A | 10/2000 | Robrahn et al. | |
| 6,142,626 A | 11/2000 | Lu et al. | |
| 6,145,984 A | 11/2000 | Farwig | |
| 6,166,848 A | 12/2000 | Cammenga et al. | |
| 6,168,271 B1 | 1/2001 | Houston et al. | |
| 6,175,450 B1 | 1/2001 | Andreani et al. | |
| 6,178,034 B1 | 1/2001 | Allemand et al. | |
| 6,210,858 B1 | 4/2001 | Yasuda et al. | |
| 6,239,778 B1 | 5/2001 | Palffy-Muhoray et al. | |
| 6,242,065 B1 | 6/2001 | Blomberg et al. | |
| 6,256,152 B1 | 7/2001 | Coldrey et al. | |
| 6,312,811 B1 | 11/2001 | Frigoli et al. | |
| 6,313,577 B1 | 11/2001 | Kunisada et al. | |
| 6,315,411 B1 | 11/2001 | Hatchiguian | |
| 6,319,594 B1 | 11/2001 | Suzuki et al. | |
| 6,334,680 B1 | 1/2002 | Larson | |
| 6,355,124 B1 | 3/2002 | Blomberg et al. | |
| 6,367,930 B1 | 4/2002 | Santelices | |
| 6,382,788 B1 | 5/2002 | Stehager | |
| 6,391,810 B1 | 5/2002 | Lenhart | |
| 6,450,652 B1 | 6/2002 | Karpen | |
| 6,416,867 B1 | 7/2002 | Karpen | |
| 6,420,290 B1 | 7/2002 | Brocheton et al. | |
| 6,460,994 B1 | 10/2002 | Nolan | |
| 6,480,250 B1 | 11/2002 | Matsufuji et al. | |
| 6,489,015 B1 | 12/2002 | Tsuchiya et al. | |
| 6,491,851 B1 | 12/2002 | Keller et al. | |
| 6,582,823 B1 | 6/2003 | Sakhrani et al. | |
| 6,604,824 B2 | 8/2003 | Larson | |
| 6,631,987 B2 | 10/2003 | Reichow et al. | |
| 6,641,261 B2 | 11/2003 | Wang et al. | |
| 6,650,473 B2 | 11/2003 | Nakagoshi | |
| 6,659,608 B2 | 12/2003 | Yamamoto et al. | |
| RE38,402 E | 1/2004 | Stephens et al. | |
| 6,677,260 B2 | 1/2004 | Crane et al. | |
| 6,696,140 B2 | 2/2004 | Suzuki | |
| 6,733,543 B2 | 5/2004 | Pyles et al. | |
| 6,770,352 B2 | 8/2004 | Suzuki et al. | |
| 6,770,692 B1 | 8/2004 | Kobayashi et al. | |
| 6,773,816 B2 | 8/2004 | Tsutsumi | |
| 6,778,240 B2 | 8/2004 | Nakamura et al. | |
| RE38,617 E | 10/2004 | Saito et al. | |
| 6,801,360 B2 | 10/2004 | Phillips et al. | |
| 6,807,006 B2 | 10/2004 | Nakagoshi | |
| 6,811,258 B1 | 11/2004 | Grant | |
| 6,811,727 B2 | 11/2004 | Havens et al. | |
| 6,849,327 B1 | 2/2005 | Ikuhara et al. | |
| 6,852,657 B2 | 2/2005 | Kolberg et al. | |
| 6,854,844 B2 | 2/2005 | Kroll et al. | |
| 6,863,397 B2 | 3/2005 | Nakano | |
| 6,886,937 B2 | 5/2005 | Moravec et al. | |
| 6,893,127 B2 | 5/2005 | Reichow et al. | |
| 6,908,647 B2 | 6/2005 | Obayashi et al. | |
| 6,908,698 B2 | 6/2005 | Yoshida et al. | |
| 6,926,405 B2 | 8/2005 | Ambler et al. | |
| 6,932,472 B2 | 8/2005 | Marason et al. | |
| 6,955,430 B2 | 10/2005 | Pratt | |
| 6,979,083 B2 | 12/2005 | Kerns, Jr. et al. | |
| 6,984,038 B2 | 1/2006 | Ishak | |
| 6,995,891 B2 | 2/2006 | Agrawal et al. | |
| 7,029,118 B2 | 4/2006 | Ishak | |
| 7,035,010 B2 | 4/2006 | Iori et al. | |
| 7,036,932 B2 | 5/2006 | Boulineau et al. | |
| 7,048,997 B2 | 5/2006 | Bhalakia et al. | |
| 6,984,262 B2 | 6/2006 | King et al. | |
| 7,106,509 B2 | 9/2006 | Sharp | |
| 7,212,341 B2 | 5/2007 | Ikeyama | |
| 7,226,162 B2 | 6/2007 | Mah | |
| 7,229,686 B2 | 6/2007 | Yoshikawa et al. | |
| 7,255,435 B2 | 8/2007 | Pratt | |
| 7,256,921 B2 | 8/2007 | Kumar et al. | |
| 7,276,544 B2 | 10/2007 | Lai et al. | |
| 7,277,215 B2 | 10/2007 | Greer | |
| 7,278,737 B2 | 10/2007 | Mainster et al. | |
| 7,349,138 B2 | 3/2008 | Kumar et al. | |
| 7,372,640 B2 | 5/2008 | Fung | |
| 7,377,639 B2 | 5/2008 | Boulineau et al. | |
| 7,393,100 B2 | 7/2008 | Mertz | |
| 7,443,608 B2 | 10/2008 | Dillon | |
| 7,506,976 B2 | 3/2009 | Baiocchi et al. | |
| 7,506,977 B1 | 3/2009 | Aiiso | |
| 7,520,608 B2 | 4/2009 | Ishak et al. | |
| 7,537,828 B2 | 5/2009 | Coggio et al. | |
| 7,556,376 B2 | 7/2009 | Ishak et al. | |
| 7,572,513 B2 | 8/2009 | Kutsukake et al. | |
| 7,597,441 B1 | 10/2009 | Farwig | |

(56) References Cited

U.S. PATENT DOCUMENTS

| | | |
|---|---|---|
| 7,604,866 B2 | 10/2009 | Ohashi et al. |
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,794,831 B2 | 9/2010 | Faris |
| 7,808,692 B2 | 10/2010 | Karmhag et al. |
| 7,842,204 B2 | 11/2010 | Chiu |
| 7,901,074 B2 | 3/2011 | Yamamoto et al. |
| 7,906,047 B2 | 3/2011 | Chen et al. |
| 7,922,324 B2 | 4/2011 | Ishibashi et al. |
| 7,926,940 B2 | 4/2011 | Blum et al. |
| 7,936,496 B2 | 5/2011 | Kosa et al. |
| 7,964,121 B2 | 6/2011 | Hsu |
| 8,004,057 B2 | 8/2011 | Tian et al. |
| 8,012,386 B2 | 9/2011 | Clere |
| 8,029,705 B2 | 10/2011 | Bhalakia et al. |
| 8,057,716 B2 | 11/2011 | Hsu |
| 8,066,371 B2 | 11/2011 | Miyoshi |
| 8,092,726 B2 | 1/2012 | Hsu |
| 8,177,358 B2 | 5/2012 | Matera et al. |
| 8,210,678 B1 | 7/2012 | Farwig |
| 8,292,430 B2 | 10/2012 | Miyoshi |
| 8,367,211 B2 | 2/2013 | Qin et al. |
| 8,398,234 B2 | 3/2013 | Wang et al. |
| 8,562,130 B2 | 10/2013 | Kosa et al. |
| 8,687,261 B2 | 4/2014 | Gillaspie et al. |
| 8,703,296 B2 | 4/2014 | Fujinaka et al. |
| 8,733,929 B2 | 5/2014 | Chiou et al. |
| 8,746,879 B2 | 6/2014 | Jiang et al. |
| 8,770,749 B2 | 7/2014 | McCabe et al. |
| 8,911,082 B2 | 12/2014 | Ambler |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 9,575,335 B1 | 2/2017 | McCabe et al. |
| 9,905,022 B1 | 2/2018 | Gordon et al. |
| 9,910,297 B1 | 3/2018 | McCabe et al. |
| 10,073,282 B2 | 9/2018 | Saylor et al. |
| 10,295,821 B2 | 5/2019 | McCabe et al. |
| 10,520,756 B2 | 12/2019 | Gallina et al. |
| 10,571,719 B1 | 2/2020 | McCabe et al. |
| 2001/0005281 A1 | 6/2001 | Yu |
| 2001/0025948 A1 | 10/2001 | Walters et al. |
| 2001/0035935 A1 | 11/2001 | Bhalakia et al. |
| 2002/0034630 A1 | 3/2002 | Cano et al. |
| 2002/0090516 A1 | 7/2002 | Loshak et al. |
| 2002/0135734 A1 | 9/2002 | Reichow et al. |
| 2003/0001991 A1 | 1/2003 | Faris et al. |
| 2003/0020988 A1 | 1/2003 | Stone |
| 2003/0076474 A1 | 4/2003 | Wang et al. |
| 2003/0086159 A1 | 5/2003 | Suzuki et al. |
| 2003/0087087 A1 | 5/2003 | Onozawa et al. |
| 2003/0129422 A1 | 7/2003 | Shirakawa et al. |
| 2004/0005482 A1 | 1/2004 | Kobayashi et al. |
| 2004/0095645 A1 | 5/2004 | Pellicori et al. |
| 2004/0174493 A1* | 9/2004 | Chen ................. G02C 7/10 351/159.62 |
| 2004/0229056 A1 | 11/2004 | Hayashi |
| 2004/0246437 A1 | 12/2004 | Ambler et al. |
| 2005/0007548 A1 | 1/2005 | Ishak |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0201585 A1 | 9/2005 | Jannard et al. |
| 2005/0224703 A1 | 10/2005 | Harada et al. |
| 2005/0233131 A1 | 10/2005 | Nishida et al. |
| 2006/0023160 A1 | 2/2006 | Cartier et al. |
| 2006/0033851 A1 | 2/2006 | Iori et al. |
| 2006/0092374 A1 | 5/2006 | Ishak |
| 2006/0146275 A1 | 7/2006 | Mertz |
| 2006/0147177 A1 | 7/2006 | Jing et al. |
| 2006/0147614 A1 | 7/2006 | Mizuno |
| 2006/0147723 A1 | 7/2006 | Jing et al. |
| 2006/0147724 A1 | 7/2006 | Mizuno |
| 2006/0158881 A1 | 7/2006 | Dowling |
| 2006/0196413 A1 | 11/2006 | Sugimura |
| 2006/0269697 A1 | 11/2006 | Sharp |
| 2006/0269733 A1 | 11/2006 | Mizuno et al. |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0195422 A1 | 8/2007 | Begon et al. |
| 2007/0236809 A1 | 10/2007 | Lippey et al. |
| 2007/0285615 A1 | 12/2007 | Yamamoto et al. |
| 2007/0287093 A1 | 12/2007 | Jing et al. |
| 2008/0023137 A1* | 1/2008 | Jiang ................. G02C 7/02 156/701 |
| 2008/0068555 A1 | 3/2008 | Lau et al. |
| 2008/0074613 A1 | 3/2008 | Phillips |
| 2008/0094566 A1 | 4/2008 | Ishak et al. |
| 2008/0187749 A1 | 8/2008 | Cael et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2008/0297879 A1 | 12/2008 | Tonar et al. |
| 2009/0040564 A1 | 2/2009 | Granger |
| 2009/0040588 A1 | 2/2009 | Tonal et al. |
| 2009/0058250 A1 | 3/2009 | Sin et al. |
| 2009/0122261 A1 | 5/2009 | Chou et al. |
| 2009/0128895 A1 | 5/2009 | Seo et al. |
| 2009/0141236 A1 | 6/2009 | Chen et al. |
| 2009/0141359 A1 | 6/2009 | Berni et al. |
| 2009/0152664 A1 | 6/2009 | Klem et al. |
| 2009/0268102 A1 | 10/2009 | Barazza |
| 2010/0003501 A1 | 1/2010 | Liu et al. |
| 2010/0054632 A1 | 3/2010 | McCormick et al. |
| 2010/0066974 A1 | 3/2010 | Croft et al. |
| 2010/0073765 A1 | 3/2010 | Brocheton |
| 2010/0102025 A1 | 4/2010 | Eagerton |
| 2010/0163165 A1 | 7/2010 | Jiang et al. |
| 2010/0232003 A1 | 9/2010 | Baldy et al. |
| 2010/0232021 A1 | 9/2010 | Walker, Jr. et al. |
| 2010/0272990 A1 | 10/2010 | Bondesan et al. |
| 2010/0283956 A1 | 11/2010 | Jackson et al. |
| 2011/0043902 A1 | 2/2011 | Ishibashi et al. |
| 2011/0229660 A1 | 3/2011 | Reynolds |
| 2011/0126345 A1 | 6/2011 | Matsumoto et al. |
| 2011/0164215 A1 | 7/2011 | Coco Martin |
| 2011/0205627 A1 | 8/2011 | Kobuchi et al. |
| 2011/0211154 A1 | 9/2011 | Aoyama et al. |
| 2011/0255051 A1 | 10/2011 | McCabe et al. |
| 2012/0015111 A1 | 1/2012 | Mishina et al. |
| 2012/0044560 A9 | 2/2012 | Lam et al. |
| 2012/0137398 A1 | 6/2012 | Arnold |
| 2012/0137414 A1 | 6/2012 | Saylor |
| 2012/0217664 A1 | 8/2012 | Saitou et al. |
| 2012/0236249 A1 | 9/2012 | Miwa et al. |
| 2012/0236255 A1 | 9/2012 | Jiang et al. |
| 2012/0287395 A1 | 11/2012 | Tamura et al. |
| 2013/0107563 A1 | 5/2013 | McCabe et al. |
| 2013/0120821 A1 | 5/2013 | Chandrasekhar |
| 2013/0127078 A1 | 5/2013 | Qin et al. |
| 2013/0141693 A1 | 6/2013 | McCabe et al. |
| 2013/0161846 A1 | 6/2013 | Goodenough et al. |
| 2013/0235452 A1 | 9/2013 | You et al. |
| 2014/0036227 A1 | 2/2014 | Tamura et al. |
| 2014/0093661 A1* | 4/2014 | Trajkovska ........ G02C 7/10 427/600 |
| 2014/0125947 A1* | 5/2014 | Imizu ................. G02B 1/14 351/159.61 |
| 2014/0232983 A1 | 8/2014 | Tokumaru et al. |
| 2014/0233105 A1 | 8/2014 | Schmeder |
| 2014/0268283 A1 | 9/2014 | Chandrasekhar |
| 2014/0334000 A1 | 11/2014 | Clerc et al. |
| 2015/0022777 A1 | 1/2015 | McCabe et al. |
| 2015/0109651 A1 | 4/2015 | Branda et al. |
| 2015/0131047 A1 | 5/2015 | Saylor et al. |
| 2015/0219931 A1 | 8/2015 | Grasso |
| 2015/0241602 A1 | 8/2015 | Avetisian, Sr. et al. |
| 2015/0374550 A1 | 9/2015 | Saylor |
| 2015/0272260 A1 | 10/2015 | Ryan et al. |
| 2015/0277146 A1 | 10/2015 | Crespo Vazquez et al. |
| 2015/0277150 A1 | 10/2015 | Granger et al. |
| 2015/0286073 A1 | 10/2015 | Blum |

(56) References Cited

U.S. PATENT DOCUMENTS

| | | |
|---|---|---|
| 2015/0362817 A1 | 12/2015 | Patterson et al. |
| 2016/0033837 A1 | 2/2016 | Bjomard et al. |
| 2016/0041408 A1 | 2/2016 | Carlson et al. |
| 2016/0048037 A1 | 2/2016 | McCabe et al. |
| 2016/0070119 A1 | 3/2016 | McCabe et al. |
| 2016/0185055 A1 | 6/2016 | Guadagnin |
| 2016/0231595 A1* | 8/2016 | Grasso ............... G02C 7/102 |
| 2016/0334644 A1 | 11/2016 | Garofolo et al. |
| 2016/0377886 A1 | 12/2016 | Quiroga et al. |
| 2017/0068113 A1 | 3/2017 | McCabe et al. |
| 2017/0075143 A1 | 3/2017 | Saylor et al. |
| 2017/0102558 A1 | 4/2017 | Saylor et al. |
| 2017/0205639 A1 | 7/2017 | McCabe et al. |
| 2017/0235160 A1 | 8/2017 | Larson |
| 2017/0315384 A1* | 11/2017 | Saylor ............... G02C 7/101 |
| 2018/0290408 A1 | 10/2018 | Park et al. |
| 2018/0299599 A1 | 10/2018 | Kumar et al. |
| 2018/0299600 A1 | 10/2018 | Miller et al. |
| 2018/0299702 A1 | 10/2018 | Nguyen et al. |
| 2019/0025611 A1 | 1/2019 | Saylor et al. |
| 2019/0278079 A1 | 9/2019 | McCabe et al. |
| 2020/0081270 A1 | 3/2020 | McCabe et al. |
| 2020/0081271 A1 | 3/2020 | McCabe et al. |
| 2020/0096792 A1 | 3/2020 | McCabe et al. |

FOREIGN PATENT DOCUMENTS

| | | |
|---|---|---|
| CN | 101772723 A | 7/2010 |
| CN | 102124394 A | 7/2011 |
| CN | 103645568 A | 3/2014 |
| CN | 204378029 U | 6/2015 |
| DE | 3534575 | 4/1986 |
| EP | 0 127 821 | 12/1984 |
| EP | 0 519 660 | 12/1992 |
| EP | 1 460 473 B1 | 8/2007 |
| EP | 1 986 024 | 10/2008 |
| EP | 2 492 723 | 8/2012 |
| EP | 2 799 514 A1 | 11/2014 |
| FR | 2812629 | 2/2002 |
| GB | 1154500 | 6/1969 |
| GB | 2522389 A | 7/2015 |
| JP | S62-123621 U | 8/1987 |
| JP | S63-008703 | 1/1988 |
| JP | H02-132417 | 5/1990 |
| JP | H04-72347 A | 3/1992 |
| JP | H05-202109 | 8/1993 |
| JP | H06-300992 A | 10/1994 |
| JP | 2000-258625 A | 9/2000 |
| JP | 2001-506012 | 5/2001 |
| JP | 2004-524558 A | 8/2004 |
| JP | 2006-031030 A | 2/2006 |
| JP | 2007-025609 | 2/2007 |
| JP | 2008-304677 A | 12/2008 |
| JP | 2009-058959 A | 3/2009 |
| JP | 2009-128912 A | 6/2009 |
| JP | 2010-204383 | 9/2010 |
| JP | 4987297 B2 | 7/2012 |
| JP | 2014-531058 A | 11/2014 |
| WO | WO 88/002871 | 4/1988 |
| WO | WO 97/035215 | 9/1997 |
| WO | WO 99/067681 | 12/1999 |
| WO | WO 02/014930 | 2/2002 |
| WO | WO 02/042629 A1 | 5/2002 |
| WO | WO 02/059684 A2 | 8/2002 |
| WO | WO 02/076632 | 10/2002 |
| WO | WO 03/058294 A2 | 7/2003 |
| WO | WO 2004/031813 A1 | 4/2004 |
| WO | WO 2008/014225 | 1/2008 |
| WO | WO 2008/110045 | 9/2008 |
| WO | WO 2008/118967 A1 | 10/2008 |
| WO | WO 2009/011439 | 1/2009 |
| WO | WO 2009/152381 | 12/2009 |
| WO | WO 2010/111499 | 9/2010 |
| WO | WO 2010/142019 A1 | 12/2010 |
| WO | WO 2011/127015 | 10/2011 |
| WO | WO 2011/130314 | 10/2011 |
| WO | WO 2012/119158 | 9/2012 |
| WO | WO 2013/034557 | 3/2013 |
| WO | WO 2013/070417 | 5/2013 |
| WO | WO 2013/074269 | 5/2013 |
| WO | WO 2013/123592 A1 | 8/2013 |
| WO | WO 2013/169987 | 11/2013 |
| WO | WO 2013/177676 A1 | 12/2013 |
| WO | WO 2014/011581 A2 | 1/2014 |
| WO | WO 2014/022049 A1 | 2/2014 |
| WO | WO 2014/055513 | 4/2014 |
| WO | WO 2015/044006 | 4/2015 |
| WO | WO 2012/079160 A1 | 6/2015 |
| WO | WO 2015/170133 | 11/2015 |
| WO | WO 2015/179538 | 11/2015 |
| WO | WO 2016/054198 | 4/2016 |
| WO | WO 2016/077431 | 5/2016 |
| WO | WO 2016/145064 A1 | 9/2016 |
| WO | WO 2016/148984 A1 | 9/2016 |
| WO | WO 2016/205757 A1 | 12/2016 |

OTHER PUBLICATIONS

AS/NZ 1067:2003 Australian/New Zealand Standard Sunglasses and Fashion Specacles; Jun. 2009 pp. 8, 10, 11 (Year: 2009).*
British Standard, "Personal Eye-Equipment—Sunglasses and Sunglare Filters for General Use and Filters for Direct Observation of the Sun," Technical Committee CEN/TC 85, Sep. 2007, pp. 46.
Caswell, "Serious Shades: High style gives way to high tech as new performance sunglasses become sophisticated optical instruments", Jul. 1988, vol. 165, No. 7, pp. 76-78.
Encyclopedia of Polymer Science and Technology—Plastics, Resins, Rubbers, Fibers, edited by Mark, H. et al, vol. 9, John Wiley & Sons, 1968, USAA, pp. 6.
Exciton, "Product List", as archived Aug. 28, 2010 on archive.org in 2 pages.
Golz et al., "Colorimetry for CRT displays," Journal of the Optical Society of America A, vol. 20, No. 5, May 2003, pp. 769-781.
Kirkpatrick et al., "Optimization by Simulated Annealing," Science, New Series, May 13, 1983, vol. 220, No. 4598, pp. 671-680.
Linear Programming, Feb. 28, 2011, http://en.wikipedia.org/w/index.php?title=Linear programmming&oldid=416428507, pp. 14.
Maui Jim, "All Sunglasses", as archived Mar. 30, 2009 on archive.org in 2 pages.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Nakamura et al, "Diffusion Coefficients of Disperse Dye to PE and PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.
"Product Description: Lagoon Sunglasses", Maui Jim website, printed on Feb. 18, 2014, web address: http://www.mauijim.com/lagoon.html, page was publicly available at least as early as Nov. 2009.
Rea et al., "Color Rendering: Beyond Pride and Prejudice," Color Research & Application, Dec. 2010, vol. 35, No. 6, pp. 401-409.
Sharp et al., "Retarder Stack Technology for Color Manipulation," SID Symposium Digest of Technical Papers, May 1999, vol. 30, No. 1, pp. 1072-1075.
Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, Mar. 1998, vol. 265, pp. 351-358.

(56) References Cited

OTHER PUBLICATIONS

Wilson, Carrie, "The How and Why of AR Coating", EyeCare professional Magazine, Oct. 2010 Issue, http://www.ecpmag.com/1webmagazine/2010/10oct/content/through the lens/Understanding-AR-Coating.asp (retrieved Oct. 9, 2013).
X-Rite, "A Guide to Understanding Color Communication", Mar. 2007, pp. 1-26, available at http://www.xrite.com/-/media/xrite/files/whitepaper_pdfs/110-001_a_guide_to_understanding-color_communication/110-001_understand_color_en.pdf.
International Search Report and Written Opinion dated Aug. 22, 2011, PCT Application No. US/2011/32172.
International Preliminary Report on Patentability and Written Opinion dated Oct. 16, 2012, International Application No. PCT/US11/32172, filed Apr. 12, 2011.
International Search Report and Written Opinion dated Feb. 5, 2013, International Application No. PCT/US2012/061060, filed Oct. 19, 2012.
International Search Report and Written Opinion dated Sep. 16, 2013, International Application No. PCT/US2013/040284, filed May 9, 2013.
"ANSI Z80.3-2010 American National Standard for Opthalmics-Nonprescription Sunglass and Fashion Eyewear Requirements," Jun. 7, 2010, pp. 1-25.
British Standard, "Personal Eye-Equipment—Sunglasses and Sunglare Filters for General Use and Filters for Direct Observation of the Sun," Technical Committee CEN/TC 85, Sep. 2007, 46 pages.
Drum, Bruce, "FDA Regulation of Labeling and Promotional Claims in Therapeutic Color Vision Devices: A Tutorial," Visual Neuroscience, May 2004, vol. 21, No. 3, pp. 461-463.
International Preliminary Report on Patentability and Written Opinion dated Sep. 3, 2013, in PCT/US2012/027790.
International Preliminary Report on Patentability and Written Opinion dated Apr. 22, 2014, in PCT Application No. PCT/US2012/061060.
International Preliminary Report on Patentability and Written Opinion dated Nov. 20, 2014, in PCT/US2013/040284.
Caswell, "Serious Shades: High style gives way to high tech as new performance sunglasses become sophisticated optical instruments," Popular Mechanics, Jul. 1988, vol. 165, No. 7, pp. 76-78.
Encyclopedia of Polymer Science and Technology—Plastics, Resins, Rubbers, Fibers, edited by Mark, H. et al, vol. 9, John Wiley & Sons, 1968, USA, pp. 50-53.
International Search Report and Written Opinion dated Jan. 13, 2016, in PCT Application No. PCT/US2015/053206.
International Preliminary Report on Patentability and Written Opinion dated Apr. 13, 2017, in PCT Application No. PCT /US2015/053206.
International Search Report and Written Opinion dated Oct. 7, 2015, in PCT Application No. PCT/US2015/031805.
International Preliminary Report on Patentability and Written Opinion dated Dec. 8, 2016, in PCT Application No. PCT/US2015/031805.
International Search Report and Written Opinion dated Jul. 27, 2012, in PCT Application No. PCT/US2012/027790.
International Search Report and Written Opinion dated May 2, 2016 in PCT Application No. PCT/US2015/060103.
International Search Report and Written Opinion dated Jun. 1, 2016, in PCT Application No. PCT/US2015/065311.
International Preliminary Report on Patentability and Written Opinion dated May 16, 2017, in PCT Application No. PCT/US2015/060103.
Maui Jim, "Terms of Use of This Website/Application," Oct. 22, 2018; 2 pgs.
A product page that describes the Maui Jim Lagoon 189-02 lens product as containing "PolarizedPlus®2," Sep. 21, 2012.
Lucatorto et al., Experimental Methods in the Physical Sciences, Chapter 2, Elsevier Inc. (2014), pp. 11-66.
Sakamoto, Yasuo, "Light Shielding and Visual Function—Challenge to Light-Shielding Glasses with Clear Color Lens," Journal of the Japanese Society for Cataract Research, vol. 22, pp. 24-28 (2010), with attached English machine translation.
International Search Report and Written Opinion, issued Apr. 12, 2019 in related PCT Application No. PCT/IB2019/050824.
"Absorber Dyes." Selective Visible and Infrared Absorbers—Absorber Dyes, 2009, exciton.luxottica.com/selective-visible-and-infrared-absorbers.html.
Extended European Search Report issued in counterpart European Patent Application No. EP 17 18 6801, mailed Feb. 7, 2018.
New dual layer cellulose acetate anti fog lens rimless fashionable snow goggles (http://hubosports.en.alibaba.com/product/60119246566-215413686/New_dual_layer_cellulose_acetate_anti_fog_lens_rimless_fashionable_snow_goggles.html).
International Search Report and Written Opinion, mailed Jan. 18, 2019 in International Application No. PCT/IB2018/058172; 19 pages.

* cited by examiner

EYEWEAR WITH VARIABLE TRANSMISSION LENS

BACKGROUND

Field

The present disclosure relates to a lens for sunglasses.

Description of Related Art

In lenses for eyeglasses, the use is known of photochromatic elements, which provide an effect that screens the sun rays and which is activated or deactivated as a function of the radiation received by the lens proper. One of ordinary skill would understand that photochromatic has the same meaning as photochromic.

Furthermore, the use is known of elements that screen the sun rays in a preset range of wavelengths, in which the screening effect is independent of the radiation, i.e. it is always active.

Also known, for example from U.S. Pat. No. 5,135,298, WO2010111499, or WO2008110045, are technical solutions which involve combining, in a multilayer lens, photochromatic elements and permanent filters that are configured to block the blue or UV component of the sun rays.

The combination of such components has undoubted advantages but, in and of itself, it does not offer a guarantee of particularly effective protection in all lighting conditions and in the entire spectrum of UV and visible frequencies.

SUMMARY

Example embodiments described herein have innovative features, no single one of which is indispensable or solely responsible for their desirable attributes. Without limiting the scope of the claims, some of the advantageous features will now be summarized.

The aim of the present disclosure is to provide a lens for eyeglasses which overcomes the drawbacks of conventional lenses as described above.

In particular, the present disclosure provides a lens for eyeglasses which is capable of ensuring a good level of protection in all lighting conditions.

The present disclosure also provides a lens for eyeglasses that allows freedom of choice in the tint of the lens, in order to confer a pleasant aesthetic appearance to someone who sees the lens of eyeglasses worn by another person.

The lens has a front surface, functionally directed toward an item to be viewed, and a rear surface, functionally directed toward the eye of a person who is wearing the eyeglasses.

In particular, the lens of the disclosure is a multilayer lens.

The lens comprises a photochromatic layer and (at least) one screening layer that defines a UV filter (specifically a UV400 filter).

The photochromatic layer is arranged in front of (or at least not behind) the screening layer (UV400); i.e., the screening layer is arranged at a distance from the front surface that is greater than or equal to the distance of the photochromatic layer from the front surface.

This makes it possible to prevent the screening layer from having an inhibiting effect on the activation of the photochromatic layer.

Preferably, the photochromatic layer is proximate to the front surface, while the screening layer is proximate to the rear surface, such that the screening layer is arranged between the rear surface and the photochromatic layer.

Alternatively, the screening layer and the photochromatic layer may be arranged at the same distance from the front surface of the lens; in this case, for example, the lens will comprise a layer (a film, a coating or a wafer) made of a material that comprises a substance that has UV400 filtering properties and a substance that has photochromatic properties, mixed together. In such case, the photochromatic and screening layers are interpenetrated in a single layer.

Such substances are constituted, for example, by powders, or by liquid solutions.

According to the disclosure, the photochromatic layer, in the range of wavelengths comprised between 380 nm and 780 nm, has a transmittance comprised between 10% and 60%, in an activated state thereof, and a wavelength comprised between 80% and 95%, in a deactivated state thereof. One of ordinary skill would understand that "transmittance," when used in reference to a spectral range, refers to the mean transmittance within the spectral range, as determined according to section 5.6.2 of ANSI Z80.3-2009.

Furthermore, the screening layer has a transmittance lower than 0.5% (preferably lower than 0.1%) in the range of wavelengths comprised between 280 nm and 400 nm.

It should be noted that, in the present description, a UV transmittance of between 280 nm and 400 nm means the TSUV transmittance of 280-400 calculated according to the AS/NZS 1067:2003.

The lens can be made of glass, or of plastics or resin; furthermore, it is also possible for the lens to have a multilayer structure that comprises (at least) one element made of glass and (at least) one element made of plastics or resin.

In a possible embodiment, the lens comprises two wafers which are superimposed and bonded by way of one or more layers of adhesive; the rear wafer has a convex surface thereof connected to a concave surface of the front layer.

In such case, the photochromatic layer can be defined by the front wafer or by the layer of adhesive.

The screening layer (UV400) can be defined by the rear wafer or, if the photochromatic layer is defined by the front wafer, by the adhesive. The fact that the screening layer (UV400) is in the adhesive has the advantage of rendering the lens particularly economical to make, because it introduces the possibility of using a rear wafer without an UV400 filter.

It is also possible to interpose a polarizing film between the two wafers; in this case the lens comprises two layers of adhesive, between which the polarizing film is interposed.

The rear wafer can also be tinted. In such case, people who see the eyeglasses externally, when they are worn by another person, see the lenses tinted with such color.

In such embodiment of the structure of the lens, the two wafers can both be made of glass; alternatively, the two wafers can both be made of plastics or resin; alternatively, the front wafer can be made of plastics and the rear wafer can be made of glass, or vice versa.

According to another embodiment (of the structure of the lens), the lens can comprise a photochromatic wafer, on which an element is overmolded which defines the screening layer (with UV400 protection). The overmolded mass, preferably, is tinted.

According to a further variation of embodiment of the lens made of plastics or resin, the lens can have a body that defines the screening layer (with UV400 protection), on whose front surface a photochromatic coating is present. In such case, preferably, the photochromatic coating is protected by a scratch-resistant lacquer. The body of the lens, preferably, is tinted.

It should be noted that the present disclosure also makes available eyeglasses with a frame and at least one lens.

Preferably, the photochromatic layer, or another (any other) layer of the lens is made of a tinted (permanently tinted) material; this gives the lens at least two different tints, with consequent change of tint of the lens (as a function of the change of state of the photochromatic layer, activated or deactivated); this gives the lens a particular aesthetic value. In fact, when the photochromatic layer is in the deactivated state, the tint of the lens for an external observer is the one conferred by the tinted element (for example yellow). When the photochromatic layer is in the activated state, by the very fact of being activated, it will give a tint to the lens (for example blue in the absence of the tinted material). Therefore, the tint assumed by the lens when the photochromatic layer is activated (green in the example given above) is constituted by the chromatic combination of the ("base") tint of the tinted element and of the tint that the photochromatic layer would assume in the absence of the tinted element.

In other words, the change in tint is due to the fact that one part of the lens is already tinted (for example a wafer, or an overmolded layer); when the photochromatic layer is activated, the second tint is seen, which is due to the sum (i.e. chromatic combination) of the base tint and the tint of the photochromatic layer in its activated state.

An innovative aspect of the subject matter disclosed herein is implemented in an eyewear comprising a lens. The lens comprises a first lens element having a first convex surface and a first concave surface; a second lens element having a second convex surface and a second concave surface, the second convex surface of the second lens element facing the first concave surface of the first lens element; an adhesive layer between the first and the second lens elements, the adhesive layer comprising photochromatic pigments configured to transition from a faded state to a darkened state when exposed to ultraviolet light; and an ultraviolet filter on the second concave surface of the second lens element. In the faded state, the lens has a mean transmittance in a wavelength range from 380 nm to 780 nm that is greater than or equal to 60% and less than or equal to 95%. In the darkened state, the lens has a mean transmittance in a wavelength range from 380 nm to 780 nm that is greater than or equal to 10% and less than or equal to 60%. The mean transmittance of the lens in a wavelength range from 280 nm to 400 nm is less than or equal to 0.5%.

The first lens element or the second lens element can comprise glass. The second lens element can be colored. The thickness of the first lens element or the second lens element along an optical axis of the lens can be between about 0.8 mm and about 1.2 mm. The thickness of the adhesive layer along an optical axis of the lens is between about 10 μm and about 100 μm. The ultraviolet filter can comprise a coating.

Another innovative aspect of the subject matter disclosed herein is implemented in an eyewear comprising a lens. The lens comprises a lens element having a convex surface and a concave surface. The lens element comprises photochromatic pigments configured to transition from a faded state to a darkened state when exposed to ultraviolet light. The lens comprises an ultraviolet filter on the concave surface of the lens element. The mean light transmittance of the lens in a wavelength range between about 380 nm and about 780 nm is between about 60% and about 95% when the photochromatic pigments are in the faded state. The mean light transmittance of the lens in a wavelength range between about 380 nm and about 780 nm is between about 10% and about 60% when the photochromatic pigments are in the darkened state. The mean light transmittance of the lens in a wavelength range between about 200 nm and about 400 nm is less than 0.5%.

The lens element can comprise glass. The lens element can be colored. The thickness of the lens element along an optical axis of the lens can be between about 0.8 mm and about 1.2 mm. The ultraviolet filter can comprise a coating.

Another innovative aspect of the subject matter disclosed herein is implemented in an eyewear comprising a lens having a convex surface and a concave surface. The lens comprises photochromatic pigments configured to transition from a faded state to a darkened state when exposed to ultraviolet light. The lens comprises an ultraviolet filter on the concave surface of the lens element. The mean light transmittance of the lens in a wavelength range between about 380 nm and about 780 nm is greater than or equal to about 30% when the photochromatic pigments are in the faded state. The mean light transmittance of the lens in a wavelength range between about 380 nm and about 780 nm is less than or equal to about 35% when the photochromatic pigments are in the darkened state. The mean light transmittance of the lens in a wavelength range between about 200 nm and about 400 nm is less than 0.5%. The CIE x-chromaticity of the lens is between 0.32 and 0.41 and the CIE y-chromaticity of the lens is between 0.36 and 0.44 when the photochromatic pigments are in the faded state. The CIE x-chromaticity of the lens is between 0.38 and 0.40 and the CIE y-chromaticity of the lens is between 0.36 and 0.42 when the photochromatic pigments are in the darkened state.

The lens can comprise a lens element comprising the photochromatic pigments. The lens element can be colored. The lens element can comprise glass. The lens can comprise an adhesive layer comprising the photochromatic pigments. The lens can further comprise a first lens element having the convex surface and a second concave surface; and a second lens element having a second convex surface and the concave surface, the second convex surface of the second lens element facing the second concave surface of the first lens element. The adhesive layer can be disposed between the first lens element and the second lens element. The thickness of the adhesive layer along an optical axis of the lens can be between about 10 μm and about 100 μm.

The mean light transmittance of the adhesive layer in a wavelength range between about 380 nm and about 780 nm can be greater than about 80% when the photochromatic pigments are in the faded state. The mean light transmittance of the adhesive layer in a wavelength range between about 380 nm and about 780 nm can be less than about 65% when the photochromatic pigments are in the darkened state. The ultraviolet filter can comprise a coating.

BRIEF DESCRIPTION OF THE DRAWINGS

This and other characteristics will become better apparent from the following description of preferred embodiments, which is illustrated merely for the purposes of non-limiting example.

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

DETAILED DESCRIPTION

Although certain embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

In the figures, the reference numeral 1 generally designates a lens for sunglasses.

The lens 1 has a (convex) front surface 2, functionally directed toward an item to be viewed, and a (concave) rear surface 3, functionally directed toward the eye of a person who is wearing the eyeglasses.

The lens comprises a photochromatic layer, proximate to the front surface 2, and a screening layer that defines a UV filter, proximate to the rear surface 3, and is thus arranged between the rear surface 3 and the photochromatic layer.

The photochromatic layer, in the range of wavelengths comprised between 380 nm and 780 nm, has a transmittance comprised between 10% and 60%, in an activated state thereof, and a transmittance comprised between 80% and 95%, in a deactivated state thereof.

The screening layer has a transmittance lower than 0.5% (preferably lower than 0.1%) in the range of wavelengths comprised between 280 nm and 400 nm.

Figure 1:
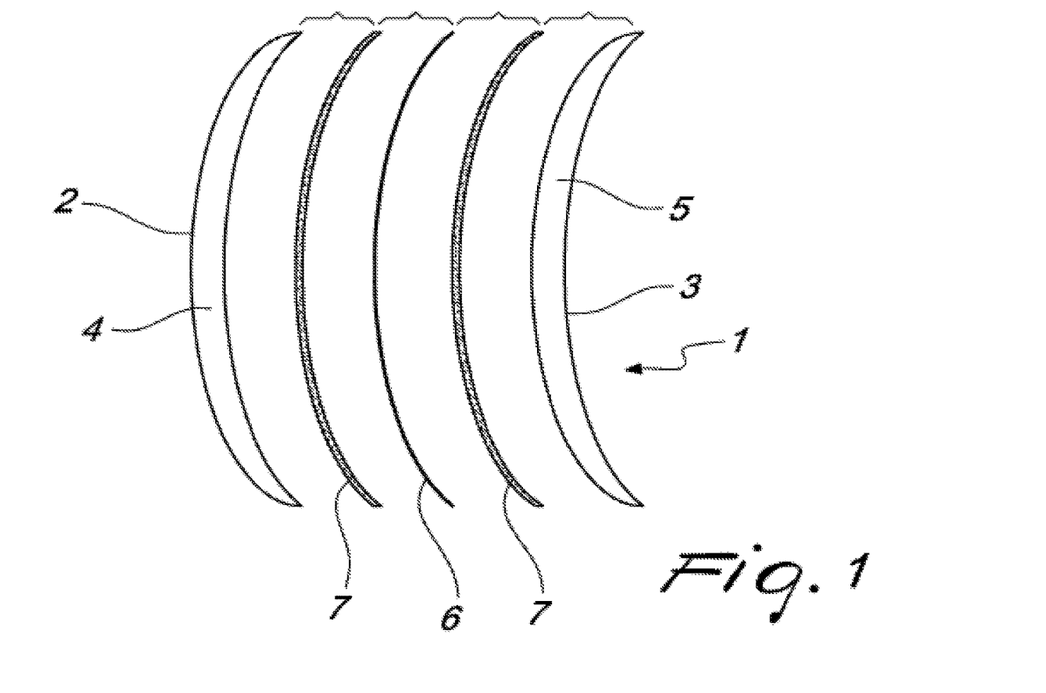
FIG. 1 is an exploded schematic view of the lens of the disclosure, according to a first embodiment.

With reference to the embodiment illustrated in FIG. 1, the lens 1 comprises a front wafer 4 and a rear wafer 5.

Preferably, a polarizing film 6 is interposed between the front wafer 4 and the rear wafer 5.

Furthermore, the lens 1 comprises a layer of adhesive 7 interposed between the front wafer 4 and the polarizing film 6 and another layer of adhesive 7 interposed between the polarizing film 6 and the rear wafer 5.

However, the polarizing film 6 can also be absent; in such case there is a single layer 7 of adhesive interposed between the front wafer 4 and the rear wafer 5. The front wafer 4 and the rear wafer 5 can be made of glass or of plastics or resin.

The photochromatic layer is defined by the front wafer 4 or, alternatively, by the layer 7 of adhesive (or by at least one of the two layers 7 of adhesive, if the polarizing film 6 is present); in particular, in such case, the adhesive 7 has a photochromatic tint or pigment (dissolved within it).

If the front wafer 4 is photochromatic, the screening layer (which defines the UV400 filter) is defined by the rear wafer 5 or, alternatively, by the layer 7 of adhesive. One of ordinary skill would understand that some implementations of a UV400 filter have a mean transmittance less than or equal to 0.5% in the range of wavelengths from 280 nm to 400 nm.

If the layer 7 of adhesive is photochromatic, the screening layer (which comprises the UV400 filter) can be incorporated in the rear wafer 5.

If the polarizing film 6 is present, interposed between the two layers 7 of adhesive, then the layer 7 of adhesive proximate to the front wafer 4 can be configured as the photochromatic layer, and the layer 7 of adhesive proximate to the rear wafer 5 can be configured as the screening layer (which defines the UV400 filter). In some other implementations, the front wafer 4 can comprise the photochromatic layer.

Preferably, the rear wafer 5 is tinted.

For example, the tinted rear wafer 5 has a transmittance comprised between 20% and 70%, in the range of wavelengths comprised between 380 nm and 780 nm. The tinted rear wafer 5 can comprise a UV filter (e.g., UV 400 filter) and be configured as the screening layer. In some other implementations, the tinted rear wafer 5 is not configured as the screening layer.

Preferably, the polarizing film 6 has a transmittance comprised between 20% and 70%, in the range of wavelengths comprised between 380 nm and 780 nm.

Figure 2:
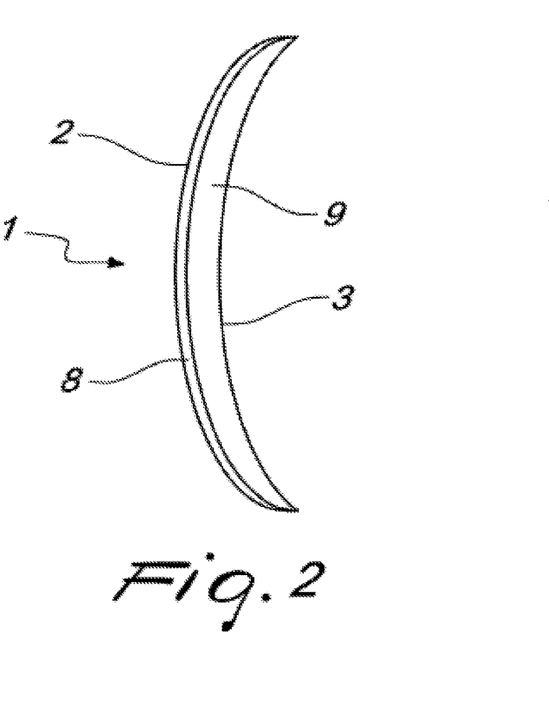
FIG. 2 is a schematic view of the lens of the disclosure, in a second embodiment.

With reference to the embodiment shown in FIG. 2, the lens 1 comprises a polychromatic wafer 8, which defines the photochromatic layer; the photochromatic wafer 8 is made of plastics or of resin; alternatively, such wafer 8 can be made of glass.

Furthermore, the lens 1 comprises an element 9 that is overmolded on the wafer 8 on the opposite side from the front surface 2; thus the overmolded element 9 defines the rear surface 3 of the lens 1.

The screening layer is defined by the mass of the overmolded element 9.

Preferably, the mass of the overmolded element is tinted.

Preferably, such tinted overmolded element has a transmittance comprised between 20% and 70%, in the range of wavelengths comprised between 380 nm and 780 nm.

Figure 3:
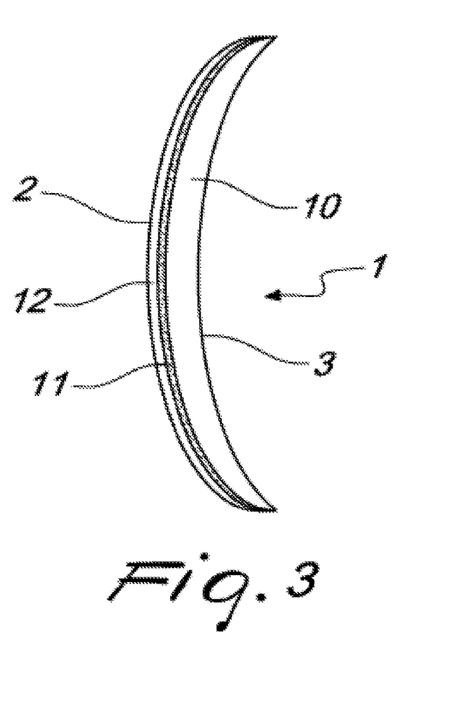
FIG. 3 is a schematic view of the lens of the disclosure, in a third embodiment.

With reference to the embodiment shown in FIG. 3, the lens 1 has a body made of a plastic material or made of a resin that screens UV rays, so as to define such screening layer (which defines the UV400 filter).

Furthermore, the lens 1 comprises a photochromatic coating 11 arranged on the side of the front surface 2 and defining the photochromatic layer.

Preferably, the lens 1 also comprises a scratch-resistant lacquer 12 overlaid on the photochromatic coating 11.

Preferably, the body 10 of the lens 1 is polarizing (or tinted).

Figure 4A:
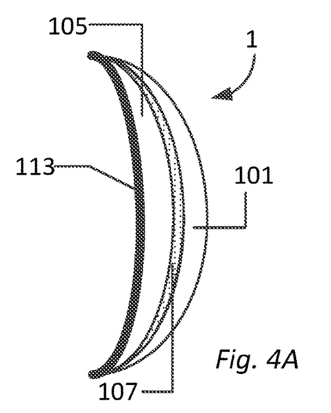
FIGS. 4A and 4B schematically illustrate a fourth embodiment of the lens contemplated by this disclosure.
Figure 4B:
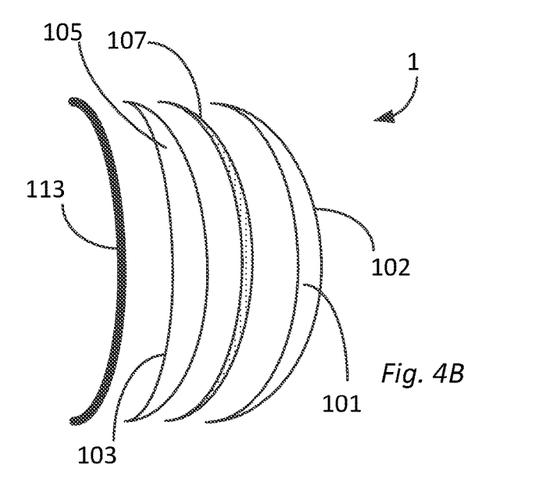

FIGS. 4A and 4B schematically illustrate another embodiment of the lens 1 contemplated by this disclosure. The lens 1 comprises a first element 101 and a second element 105.

The first lens element 101 comprises a convex surface 102 and a concave surface opposite the convex surface 102. The second lens element 105 comprises a concave surface 103 and a convex surface facing the concave surface of the first lens element 101. The first and the second lens elements 101 and 105 are adhered together by an adhesive layer 107 disposed between the first and the second elements 101 and 105. In various embodiments, the first and/or the second lens elements 101 and 105 can have convex and concave surfaces with the same curvature. The first and/or the second lens elements 101 and 105 can be a plano lens. The first and/or the second lens elements 101 and 105 can be a prescription lens configured to provide vision correct. The first and/or the second lens elements 101 and 105 can have optical power. The lens 1 comprising the first and the second lens elements 101 and 105 can be a plano lens. The lens 1 comprising the first and the second lens elements 101 and 105 can be a prescription lens.

An ultraviolet (UV) filter configured to block ultraviolet light can be at least partially incorporated into a coating 113. The coating 113 can be disposed on the concave surface 103 of the second lens element 105. In various embodiments, the coating 113 can be disposed directly on the concave surface 103 of the second lens element 105 without any intervening films, coatings and/or layers. In some embodiments, the coating 113 can be disposed on the concave surface 103 of the second lens element 105 with intervening films, coatings and/or layers disposed between the coating 113 and the concave surface 103 of the second lens element 105. In various embodiments, the coating 113 can be configured as the UV400 filter discussed above. Accordingly, in various embodiments, the coating 113 can have optical properties that are similar to the screening layer discussed above. In various embodiments, the coating 113 can be configured to block ultraviolet light in the wavelength range between about 200 nm and about 400 nm. In various embodiments, the coating 113 can be configured to block ultraviolet light in the wavelength range between about 200 nm and about 400 nm and/or in the wavelength range between about 280 nm and about 400 nm. In various embodiments, the coating 113 can be configured to have a mean transmittance between about 0.05% and about 0.5% for wavelengths in the ultraviolet spectral range (e.g., between about 200 nm and about 400 nm and/or between about 280 nm and about 400 nm). For example, in various embodiments, the coating 113 can be configured to have a mean transmittance between about 0.08% and about 0.4%, between about 0.1% and about 0.3%, and/or between about 0.15% and about 0.25% for wavelengths in the ultraviolet spectral range. In various embodiments, the coating 113 can be disposed on the concave surface 103 by various manufacturing methods. For example, in some implementations, the coating 113 can be disposed on the concave surface 103 by a deposition process, such as, for example, physical vapor deposition (PVD), chemical vapor deposition (CVD), sputtering, spin coating, etc.

In various embodiments, the lens 1 can comprise in sequence the first lens element 101, the adhesive layer 107, the second lens element 105, and the coating 113. In some embodiments, the lens 1 comprises no intervening films, layers, coatings and/or gaps between the first lens element 101 and the adhesive layer 107 or the second lens element 105 and the adhesive layer 107. However, in other embodiments, the lens 1 can comprise films, layers, coatings and/or gaps between the first lens element 101 and the adhesive layer 107 or the second lens element 105 and the adhesive layer 107.

As discussed above, an eyewear configured to be worn by a user can comprise the embodiment of lens 1 illustrated in FIGS. 4A and 4B. When worn by the user, the first lens element 101 can be configured as a front lens element configured to receive ambient light and the second lens element 105 can be configured as a rear lens element facing the eye of the user. Various physical and optical properties of the first lens element 101 can be similar to various physical and optical properties of the front wafer 4 discussed above. Various physical and optical properties of the second lens element 105 can be similar to various physical and optical properties of the rear wafer 5 discussed above. Various physical and optical properties of the adhesive layer 107 can be similar to various physical and optical properties of the layer 7 discussed above.

In various implementations, the first lens element 101 can comprise glass. In some implementations, the first lens element 101 can comprise plastic, resin or a composite material. In various implementations, the first lens element 101 can be clear. The first lens element 101 can be transparent to light. For example, the first lens element 101 can be transparent to ultraviolet light, visible light and/or infrared light. In various embodiments, the first lens element 101 can be transparent to light in a wavelength range between about 200 nm and about 980 nm, between about 250 nm and about 750 nm, between about 400 nm and about 650 nm, between about 450 nm and about 650 nm, or any wavelength range in these ranges/sub-ranges. In various embodiments, the first lens element 101 can have a luminous transmittance greater than or equal to about 95%. In various embodiments, the first lens element 101 can comprise materials that do not block ultraviolet (UV) light. In some embodiments, the first lens element 101 has a mean transmittance of greater than or equal to 50%, greater than or equal to 75%, greater than or equal to 85%, greater than or equal to 90%, or greater than or equal to 95% within the spectral range of 200 nm to 400 nm. Thus, the first lens element can be configured to not block UV light. The first lens element 101 can be configured to have a thickness between about 0.8 mm and about 1.2 mm along the optical axis of the first lens element 101 (or the optical axis of the lens 1). For example, the thickness of the first lens element 101 along the optical axis of the first lens element 101 (or the optical axis of the lens 1) can be about 1 mm. As another example, the maximum thickness of the first lens element 101 can be greater than or equal to about 0.8 mm and less than or equal to about 1.2 mm.

In various implementations, the second lens element 105 can comprise glass. In some implementations, the second lens element 105 can comprise plastic, resin or a composite material. The second lens element 105 can be configured mass-colored and/or tinted by incorporation of various chromophores, pigments, dyes, rare-earth oxides etc. For example, the second lens element 105 can be configured to appear brown, green, purple, grey, greenish-brown, or any other desired color. In various embodiments, the second lens element 105 can have a CIE chromaticity x value between about 0.30 and about 0.34 and a CIE chromaticity y value between about 0.30 and about 0.34. In various embodiments, the lens 1 can have a CIE chromaticity x value between about 0.30 and about 0.34 and a CIE chromaticity y value between about 0.30 and about 0.34 as a result of the color or tint of second lens element 105. The CIE chromaticity x value and y value can be measured using a standard 2-degree observer and a D65 illuminant.

The second lens element 105 can also be transparent to light. For example, the second lens element 105 can be transparent to ultraviolet light, visible light and/or infrared light. In various embodiments, the second lens element 105 can be transparent to light in a wavelength range between about 200 nm and about 980 nm, between about 250 nm and about 750 nm, between about 400 nm and about 650 nm, between about 450 nm and about 650 nm, or any wavelength range in these ranges/sub-ranges. In various embodiments, the second lens element 105 can have a luminous transmittance greater than or equal to about 95%. The second lens element 105 can be configured to have a thickness between about 0.8 mm and about 1.2 mm along the optical axis of the second lens element 105 (or the optical axis of the lens 1). For example, the thickness of the second lens element 105 along the optical axis of the second lens element 105 (or the optical axis of the lens 1) can be about 1 mm. As another example, the maximum thickness of the second lens element 105 can be greater than or equal to about 0.8 mm and less than or equal to about 1.2 mm.

The adhesive layer 107 can have a thickness between about 10 µm and about 100 µm along the optical axis of the lens 1. The adhesive layer 107 can comprise photochromatic material (e.g., photochromatic pigments and/or tints). The photochromatic material in the adhesive layer 107 can be configured to transition from a faded state to a darkened state when exposed to an amount of UV light typical during daytime. Accordingly, the mean transmittance of visible light in a wavelength range between about 380 nm and about 780 nm through the lens 1 when the photochromatic material in the adhesive layer 107 are in the faded state can be between about 60% and about 100%. The mean transmittance of visible light in a wavelength range between about 380 nm and about 780 nm through the lens 1 when the photochromatic material in the adhesive layer 107 are in the darkened state can be between about 5% and about 70%.

The adhesive layer 107 comprising the photochromatic material and/or the lens 1 comprising the adhesive layer 107 can have a mean visible light transmittance of at least 60% in the faded state. The mean visible light transmittance is the mean transmittance between 380 nm and 780 nm as calculated according to section 5.6.2 of ANSI specification Z80.3-2009. For example, the adhesive layer 107 comprising the photochromatic material and/or the lens 1 comprising the adhesive layer 107 can have a mean visible light transmittance greater than or equal to about 60% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values. As another example, the adhesive layer 107 can have a mean visible light transmittance in the faded state between about 85% and about 90%.

The adhesive layer 107 comprising the photochromatic material and/or the lens 1 comprising the adhesive layer 107 can have a mean visible light transmittance less than or equal to about 88% in the darkened state. For example, the adhesive layer 107 comprising the photochromatic material and/or the lens 1 comprising the adhesive layer 107 can have a mean visible light transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, less than or equal to about 30%, less than or equal to about 20%, less than or equal to about 10%, or any other value in the ranges/sub-ranges defined by these values. As another example, the adhesive layer 107 can have a mean visible light transmittance in the darkened state between about 40% and about 45%. As yet another example, the adhesive layer 107 can have a mean visible light transmittance in the darkened state between about 60% and about 65%. The percentage change in the value of the mean visible light transmittance of the adhesive layer 107 when transitioning from the faded state to the darkened state or vice-versa can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

The adhesive layer 107 comprising the photochromatic material and/or the lens 1 comprising the adhesive layer 107 can have a luminous transmittance of at least 60% in the faded state. For example, The adhesive layer 107 comprising the photochromatic material and/or the lens 1 comprising the adhesive layer 107 can have a luminous transmittance greater than or equal to about 60% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values. As another example, the adhesive layer 107 can have a luminous transmittance in the faded state between about 85% and about 90%. The luminous transmittance can be determined according to a technique defined in section 5.6.1 of the ANSI Z80.3-2009 specification for nonprescription sunglass and fashion eyewear requirements. CIE Illuminant D65 can be used rather than CIE Illuminant C as the light source. The state in which the adhesive layer 107 comprising the photochromatic material and/or the lens 1 comprising the adhesive layer 107 has a luminous transmittance of at least 60% can be referred to as the faded state.

The adhesive layer 107 comprising the photochromatic material and/or the lens 1 comprising the adhesive layer 107 can have a luminous transmittance less than or equal to about 88% in the darkened state. For example, the adhesive layer 107 comprising the photochromatic material and/or the lens 1 comprising the adhesive layer 107 can have a luminous transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, less than or equal to about 30%, less than or equal to about 20%, less than or equal to about 10%, or any other value in the ranges/sub-ranges defined by these values. The state in which the adhesive layer 107 comprising the photochromatic material and/or the lens 1 comprising the adhesive layer 107 has a luminous transmittance less than or equal to about 88% can be referred to as the dark/darkened state. As another example, the adhesive layer 107 can have a luminous transmittance in the darkened state between about 40% and about 45%. As yet another example, the adhesive layer 107 can have a luminous transmittance in the darkened state between about 60% and about 65%. The percentage change in the value of luminous transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

In some implementations, the adhesive layer 107 can have a colored appearance in the darkened and/or faded state. For example, the adhesive layer 107 can have a blue, green or red color in the darkened and/or faded state. The lens 1 can have a colored appearance as a result of the color of the adhesive layer 107, the second element 105, the first element 101 or other components of the lens 1. In some implementations, the color of the lens 1 is visible in the darkened state while in the faded state, the lens 1 appears clear. The lens 1 can appear brown, green, blue or yellow in the faded state and appear a darker (or more saturated) brown, purple, grey, yellowish grey or purplish brown in the darkened state.

The mean visible light transmittance and/or a luminous transmittance in a wavelength range between about 380 nm and about 780 nm of the adhesive layer 107 can be greater than or equal to about 80% in the faded state. For example, the adhesive layer 107 can have a mean visible light transmittance and/or a luminous transmittance in the faded state between about 80% and about 85%, between about 82% and about 87%, between about 85% and about 90%, greater than or equal to about 90%, or a value in a range/sub-range defined by any of these values.

The mean visible light transmittance and/or a luminous transmittance in a wavelength range between about 380 nm and about 780 nm of the adhesive layer 107 can be less than or equal to about 65% in the darkened state. For example, the adhesive layer 107 can have a mean visible light transmittance and/or a luminous transmittance in the darkened state between about 60% and about 65%, between about 55% and about 60%, between about 45% and about 50%, between about 40% and about 45%, or a value in a range/sub-range defined by any of these values.

The lens 1 can have a CIE chromaticity x value between about 0.30 and about 0.41. For example, the CIE chromaticity x value in the faded state of lens 1 can be between about 0.3 and about 0.34, between about 0.32 and about 0.35, between about 0.34 and about 0.38, between about 0.37 and about 0.4, between about 0.38 and about 0.42, or any value in a range/sub-range defined by any of these values. The lens 1 can have a CIE chromaticity y value between about 0.35 and about 0.44 in the faded state. For example, the CIE chromaticity y value in the faded state of lens 1 can be between about 0.36 and about 0.4, between about 0.37 and about 0.42, between about 0.4 and about 0.42, between about 0.4 and about 0.43, or any value in a range/sub-range defined by any of these values. The CIE chromaticity x value and y value can be measured using a standard 2-degree observer and a D65 illuminant.

The lens 1 can have a CIE chromaticity x value between about 0.35 and about 0.4. For example, the lens 1 can have a CIE chromaticity x value in the darkened state between about 0.35 and about 0.38, between about 0.37 and about 0.39, between about 0.38 and about 0.39, between about 0.38 and about 0.4, or any value in a range/sub-range defined by any of these values. The lens 1 can have a CIE chromaticity y value between about 0.35 and about 0.43 in the darkened state. For example, the lens 1 can have a CIE chromaticity y value in the darkened state between about 0.36 and about 0.38, between about 0.37 and about 0.39, between about 0.37 and about 0.4, between about 0.38 and about 0.42, or any value in a range/sub-range defined by any of these values. The CIE chromaticity x value and y value can be measured using a standard 2-degree observer and a D65 illuminant.

The mean visible light transmittance and/or a luminous transmittance in a wavelength range between about 380 nm and about 780 nm of lens 1 can be greater than or equal to about 30% in the faded state. For example, the lens 1 can have a mean visible light transmittance and/or a luminous transmittance between about 30% and about 80% in the faded state. As another example, the lens 1 can have a mean visible light transmittance and/or a luminous transmittance in the faded state between about 30% and about 75%, between about 30% and about 70%, between about 30% and about 50%, between about 30% and about 45%, between about 30% and about 40%, between about 30% and about 38%, between about 35% and about 71%, between about 38% and about 45%, or a value in a range/sub-range defined by any of these values.

The mean visible light transmittance and/or a luminous transmittance in a wavelength range between about 380 nm and about 780 nm of lens 1 can be less than or equal to about 35% in the darkened state. For example, the lens 1 can have a mean visible light transmittance and/or a luminous transmittance between about 10% and about 35% in the darkened state. As another example, the lens 1 can have a mean visible light transmittance and/or a luminous transmittance in the faded state between about 14% and about 34%, between about 14% and about 24%, between about 20% and about 30%, between about 10% and about 20%, or a value in a range/sub-range defined by any of these values.

Figure 5A:
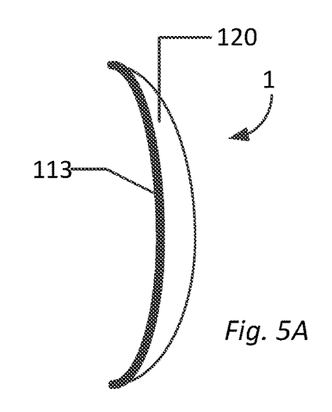
FIGS. 5A and 5B schematically illustrate a fifth embodiment of the lens contemplated by this disclosure.
Figure 5B:
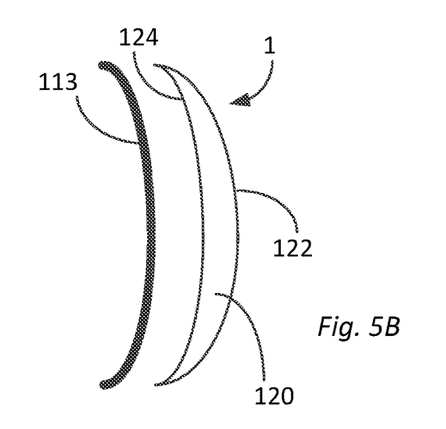

FIGS. 5A and 5B schematically illustrate another embodiment of the lens 1 contemplated by this disclosure. The lens 1 comprises a lens element 120 having a convex surface 122 and a concave surface 124. In various embodiments, the convex surface 122 and the concave surface 124 can have the same curvature. The lens element 120 can have optical power. The lens element 120 can be a plano lens. The lens element 120 can be a prescription lens configured to provide vision correct. The lens element 120 can have optical power. The lens 1 comprising the lens element 120 can be a plano lens. The lens 1 comprising the lens element 120 can be a prescription lens.

An ultraviolet (UV) filter configured to block ultraviolet light can be at least partially incorporated into a coating 113. The coating 113 can be disposed on the concave surface 124 of the lens element 122. In various embodiments, the coating 113 can be disposed directly on the concave surface 124 of the lens element 122 without any intervening films, coatings and/or layers. In some embodiments, the coating 113 can be disposed on the concave surface 124 of the lens element 122 with intervening films, coatings and/or layers disposed between the coating 113 and the concave surface 124 of the lens element 122. In various embodiments, the coating 113 can be configured as the UV400 filter discussed above. Accordingly, in various embodiments, the coating 113 can have optical properties that are similar to the screening layer discussed above. In various embodiments, the coating 113 can be configured to block ultraviolet light in the wavelength range between about 200 nm and about 400 nm. In various embodiments, the coating 113 can be configured to block ultraviolet light in the wavelength range between about 200 nm and about 400 nm and/or in the wavelength range between about 280 nm and about 400 nm. In various embodiments, the coating 113 can be configured to have a mean transmittance between about 0.05% and about 0.5% for wavelengths in the ultraviolet spectral range (e.g., between about 200 nm and about 400 nm and/or between about 280 nm and about 400 nm). For example, in various embodiments, the coating 113 can be configured to have a mean transmittance between about 0.08% and about 0.4%, between about 0.1% and about 0.3%, and/or between about 0.15% and about 0.25% for wavelengths in the ultraviolet spectral range. In various embodiments, the coating 113 can be disposed on the concave surface 103 by various manufacturing methods. For example, in some implementations, the coating 113 can be disposed on the concave surface 103 by a deposition process, such as, for example, physical vapor deposition (PVD), chemical vapor deposition (CVD), sputtering, spin coating, etc.

As discussed above, an eyewear configured to be worn by a user can comprise the embodiment of lens 1 illustrated in FIGS. 5A and 5B. When worn by the user, the convex surface 122 can be configured as a front surface configured to receive ambient light and the concave surface 124 can be configured as a rear surface facing the eye of the user. Various physical and optical properties of the lens element 120 can be similar to various physical and optical properties of the lens body 10 discussed above.

In various implementations, the lens element 120 can comprise glass. In some implementations, the lens element 120 can comprise plastic, resin or a composite material. The lens element 120 can be configured mass-colored and/or tinted by incorporation of various pigments, dyes, rare-earth oxides etc. For example, the lens element 120 can be configured to appear brown, yellow, green, purple, grey, greenish-brown, yellowish-grey or any other desired color. In various embodiments, the lens element 120 can have a CIE chromaticity x value between about 0.30 and about 0.34 and a CIE chromaticity y value between about 0.30 and about 0.34. The lens 1 can have a colored appearance as a result of the color of the lens element 120 or other elements/components of the lens 1. In some implementations, the color of the lens 1 is visible in the darkened state while in the faded state, the lens 1 appears clear. The lens 1 can appear brown, green, blue or yellow in the faded state and appear a darker (or more saturated) brown, purple, grey, yellowish grey or purplish brown in the darkened state.

The lens 1 can have a CIE chromaticity x value between about 0.30 and about 0.41. For example, the CIE chromaticity x value in the faded state of lens 1 can be between about 0.3 and about 0.34, between about 0.32 and about 0.35, between about 0.34 and about 0.38, between about 0.37 and about 0.4, between about 0.38 and about 0.42, or any value in a range/sub-range defined by any of these values. The lens 1 can have a CIE chromaticity y value between about 0.35 and about 0.44 in the faded state. For example, the CIE chromaticity y value in the faded state of lens 1 can be between about 0.36 and about 0.4, between about 0.37 and about 0.42, between about 0.4 and about 0.42, between about 0.4 and about 0.43, or any value in a range/sub-range defined by any of these values. The CIE chromaticity x value and y value can be measured using a standard 2-degree observer and a D65 illuminant.

The lens 1 can have a CIE chromaticity x value between about 0.35 and about 0.4. For example, the lens 1 can have a CIE chromaticity x value in the darkened state between about 0.35 and about 0.38, between about 0.37 and about 0.39, between about 0.38 and about 0.39, between about 0.38 and about 0.4, or any value in a range/sub-range defined by any of these values. The lens 1 can have a CIE chromaticity y value between about 0.35 and about 0.43 in the darkened state. For example, the lens 1 can have a CIE chromaticity y value in the darkened state between about 0.36 and about 0.38, between about 0.37 and about 0.39, between about 0.37 and about 0.4, between about 0.38 and about 0.42, or any value in a range/sub-range defined by any of these values. The CIE chromaticity x value and y value can be measured using a standard 2-degree observer and a D65 illuminant.

The lens element 120 can be transparent to light. For example, the lens element 120 can be transparent to ultraviolet light, visible light and/or infrared light. In various embodiments, the lens element 120 can be transparent to light in a wavelength range between about 200 nm and about 980 nm, between about 250 nm and about 750 nm, between about 400 nm and about 650 nm, between about 450 nm and about 650 nm, or any wavelength range in these ranges/sub-ranges. In various embodiments, the lens element 120 can be configured to have a luminous transmittance greater than or equal to about 95%. The lens element 120 can be configured to have a thickness between about 0.8 mm and about 1.2 mm along the optical axis of the lens element 120 (or the optical axis of the lens 1). For example, the thickness of the lens element 120 along the optical axis of the lens element 120 (or the optical axis of the lens 1) can be about 1 mm. As another example, the maximum thickness of the lens element 120 can be greater than or equal to about 0.8 mm and less than or equal to about 1.2 mm.

The lens element 120 can further comprise photochromatic material (e.g., photochromatic pigments and/or tints). The photochromatic material in the lens element 120 can be configured to transition from a faded state to a darkened state when exposed to an amount of UV light typical of a sunny day outdoors. Accordingly, the mean transmittance of visible light in a wavelength range between about 380 nm and about 780 nm through the lens 1 when the photochromatic material in the lens element 120 are in the faded state can be between about 60% and about 100%. The mean transmittance of visible light in a wavelength range between about 380 nm and about 780 nm through the lens 1 when the photochromatic material in the lens element 120 are in the darkened state can be between about 5% and about 70%.

The lens element 120 and/or the lens 1 comprising the lens element 120 can have a mean visible light transmittance of at least 60% in the faded state. The mean visible light transmittance is given by the amount of incident visible light that is transmitted through the lens. For example, the lens element 120 and/or the lens 1 comprising the lens element 120 can have a mean visible light transmittance greater than or equal to about 60% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values.

The lens element 120 and/or the lens 1 comprising the lens element 120 can have a mean visible light transmittance less than or equal to about 88% in the darkened state. For example, the lens element 120 and/or the lens 1 comprising the lens element 120 can have a mean visible light transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, less than or equal to about 30%, less than or equal to about 20%, less than or equal to about 10%, or any other value in the ranges/sub-ranges defined by these values. The percentage change in the value of the mean visible light transmittance when transitioning from the faded state to the darkened state or vice-versa can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

The lens element 120 and/or the lens 1 comprising the lens element 120 can have a luminous transmittance of at least 60% in the faded state. For example, the lens element 120 and/or the lens 1 comprising the lens element 120 can have a luminous transmittance greater than or equal to about 60% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values. The luminous transmittance can be determined according to a technique defined in section 5.6.1 of the ANSI Z80.3-2009 specification for nonprescription sunglass and fashion eyewear requirements. CIE Illuminant D65 can be used rather than CIE Illuminant C as the light source. The state in which the lens element 120 and/or the lens 1 comprising the lens element 120 has a luminous transmittance of at least 60% can be referred to as the faded state.

The lens element 120 and/or the lens 1 comprising the lens element 120 can have a luminous transmittance less than or equal to about 88% in the darkened state. For example, the lens element 120 and/or the lens 1 comprising the lens element 120 can have a luminous transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, less than or equal to about 30%, less than or equal to about 20%, less than or equal to about 10%, or any other value in the ranges/sub-ranges defined by these values. The state in which the lens element 120 and/or the lens 1 comprising the lens element 120 has a luminous transmittance less than or equal to about 88% can be referred to as the dark/darkened state. The percentage change in the value of luminous transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

The mean visible light transmittance and/or a luminous transmittance in a wavelength range between about 380 nm and about 780 nm of lens 1 can be greater than or equal to about 30% in the faded state. For example, the lens 1 can have a mean visible light transmittance and/or a luminous transmittance between about 30% and about 80% in the faded state. As another example, the lens 1 can have a mean visible light transmittance and/or a luminous transmittance in the faded state between about 30% and about 75%, between about 30% and 70%, between about 30% and about 50%, between about 30% and about 45%, between about 30% and about 40%, between about 30% and about 38%, between about 35% and about 71%, between about 38% and about 45%, or a value in a range/sub-range defined by any of these values.

The mean visible light transmittance and/or a luminous transmittance in a wavelength range between about 380 nm and about 780 nm of lens 1 can be less than or equal to about 35% in the darkened state. For example, the lens 1 can have a mean visible light transmittance and/or a luminous transmittance between about 10% and about 35% in the darkened state. As another example, the lens 1 can have a mean visible light transmittance and/or a luminous transmittance in the faded state between about 14% and about 34%, between about 14% and about 24%, between about 20% and about 30%, between about 10% and about 20%, or a value in a range/sub-range defined by any of these values.

Various embodiments of the lens 1 described herein can be included in an eyewear. The eyewear can be of any type, including general-purpose eyewear, special-purpose eyewear, sunglasses, driving glasses, sporting glasses, goggles, indoor eyewear, outdoor eyewear, vision-correcting eyewear, contrast-enhancing eyewear, eyewear designed for another purpose, or eyewear designed for a combination of purposes. Various embodiments of the lens 1 can be implemented in any headworn support (i.e., a headworn article that can support one or more lenses in the wearer's field of view). For example, other headworn supports can include, but are not limited to, helmets, face masks, balaclavas, and breaching shields. Various embodiments of the lens 1 can be corrective lenses or non-corrective lenses and can be made of any of a variety of optical materials including glass and/or plastics, such as, for example, acrylics or polycarbonates. The lenses can have various shapes. For example, various embodiments of the lens 1 can be flat, have 1 axis of curvature, 2 axes of curvature, or more than 2 axes of curvature. Various embodiments of the lens 1 can be cylindrical, parabolic, spherical, flat, or elliptical, or any other shape such as a meniscus or catenoid. When worn, various embodiments of the lens 1 can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, various embodiments of the lens 1 extend across a portion of the wearer's normal straight ahead line of sight.

The outside surface of various embodiments of the lens 1 can conform to a shape having a smooth, continuous surface having a constant horizontal radius (sphere or cylinder) or progressive curve (ellipse, toroid or ovoid) or other aspheric shape in either the horizontal or vertical planes. The geometric shape of other embodiments can be generally cylindrical, having curvature in one axis and no curvature in a second axis. Various embodiments of the lens 1 can have a curvature in one or more dimensions. For example, various embodiments of the lens 1 can be curved along a horizontal axis. As another example, various embodiments of the lens 1 can be characterized in a horizontal plane by a generally arcuate shape, extending from a medial edge throughout at least a portion of the wearer's range of vision to a lateral edge. In some embodiments, various embodiments of the lens 1 are substantially linear (not curved) along a vertical axis. In some embodiments, various embodiments of the lens 1 have a first radius of curvature in one region, a second radius of curvature in a second region, and transition sites disposed on either side of the first and second regions. The transition sites can be a coincidence point along the lens 1 where the radius of curvature of the lens 1 transitions from the first to the second radius of curvature, and vice versa. In some embodiments, the lens 1 can have a third radius of curvature in a parallel direction, a perpendicular direction, or some other direction. In some embodiments, the lens 1 can lie on a common circle. The right and left lenses in a high-wrap eyeglass can be canted such that the medial edge of each lens will fall outside of the common circle and the lateral edges will fall inside of the common circle. Providing curvature in various embodiments of the lens 1 can result in various advantageous optical qualities for the wearer, including reducing the prismatic shift of light rays passing through the various embodiments of the lens 1, and providing an optical correction.

A variety of lens configurations in both horizontal and vertical planes are possible. Thus, for example, either the outer or the inner or both surfaces of various embodiments of the lens 1 can generally conform to a spherical shape or to a right circular cylinder. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

Various embodiments of the lens 1 can be linear (not curved) along a vertical plane (e.g., cylindrical or frusto-conical lens geometry). Various embodiments of the lens 1 can be aligned substantially parallel with the vertical axis such that the line of sight is substantially normal to the anterior surface and the posterior surface of the lens 1. Various embodiments of the lens 1 are angled downward such that a line normal to the lens is offset from the straight ahead normal line of sight by an angle $\phi$. The angle $\phi$ of offset can be greater than about 0° and/or less than about 30°, or greater than about 70° and/or less than about 20°, or about 15°, although other angles $\phi$ outside of these ranges may also be used. Various cylindrically shaped lenses may be used. The anterior surface and/or the posterior surface of the lens 1 can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the eyewear incorporates canted lenses mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens 1 at a non-perpendicular angle.

Various embodiments of the lens 1 can be provided with anterior and posterior surfaces and a thickness therebetween, which can be variable along the horizontal direction, vertical direction, or combination of directions. In some embodiments, the lens 1 can have a varying thickness along the horizontal or vertical axis, or along some other direction. In some embodiments, the thickness of the lens 1 tapers smoothly, though not necessarily linearly, from a maximum thickness proximate a medial edge to a relatively lesser thickness at a lateral edge. The lens 1 can have a tapering thickness along the horizontal axis and can be decentered for optical correction. In some embodiments, the lens 1 can have a thickness configured to provide an optical correction. For example, the thickness of the lens 1 can taper from a thickest point at a central point of the lens 1 approaching lateral segments of the lens 1. In some embodiments, the average thickness of the lens 1 in the lateral segments can be less than the average thickness of the lens 1 in the central zone. In some embodiments, the thickness of the lens 1 in at least one point in the central zone can be greater than the thickness of the lens 1 at any point within at least one of the lateral segments. In some embodiments, the average thickness of the lens 1 in the central zone can be between about 0.8 mm and about 2.5 mm (e.g., about 1.0 mm, about 1.5 mm, about 2.0 mm, about 2.2 mm, etc.).

In some embodiments, various embodiments of the lens 1 can be finished, as opposed to semi-finished, with the lens 1 being contoured to modify the focal power. Various embodiments of the lens 1 can be semi-finished so that lens 1 can be capable of being machined, at some time following manufacture, to modify their focal power. Various embodiments of the lens 1 can have optical power and can be prescription lenses configured to correct for near-sighted or far-sighted vision. Various embodiments of the lens 1 can have cylindrical characteristics to correct for astigmatism.

The eyewear can include a mounting frame configured to support the lens 1. The mounting frame can include orbitals that partially or completely surround the lens 1. The frame can be of varying configurations and designs. The frame may include a top frame portion and a pair of ear stems that are connected to opposing ends of the top frame portion. Further, the lens 1 may be mounted to the frame with an upper edge of the lens 1 extending along or within a lens groove and being secured to the frame. For example, the upper edge of the lens 1 can be formed in a pattern, such as a jagged or non-linear edge, and apertures or other shapes around which the frame can be injection molded or fastened in order to secure the lens 1 to the frame. Further, the lens 1 can be removably attachable to the frame by means of a slot with inter-fitting projections or other attachment structure formed in the lens 1 and/or the frame.

It is also contemplated that the lens 1 can be secured along a lower edge of the frame. Various other configurations can also be utilized. Such configurations can include the direct attachment of the ear stems to the lens 1 without any frame, or other configurations that can reduce the overall weight, size, or profile of the eyeglasses. In addition, various materials can be utilized in the manufacture of the frame, such as metals, composites, or relatively rigid, molded thermoplastic materials which are well known in the art, and which can be transparent or available in a variety of colors. Indeed, the mounting frame can be fabricated according to various configurations and designs as desired. In some embodiments, the frame is configured to retain a unitary lens that is placed in front of both eyes when the eyewear is worn. Eyewear (e.g., goggles) can also be provided that include a unitary lens that is placed in front of both eyes when the eyewear is worn. The unitary lens having features similar to the lens 1 can be implemented in other types of headworn supports such as, but not limited to, helmets, face masks, balaclavas, and breaching shields.

In some embodiments, the ear stems can be pivotably attached to the frame. In some embodiments, the ear stems attach directly to the lens 1. The ear stems can be configured to support the eyewear when worn by a user. For example, the ear stems can be configured to rest on the ears of the user. In some embodiments, the eyewear includes a flexible band used to secure the eyewear in front of the user's eyes in place of ear stems.

In some embodiments, the lens 1 can include layers that provide additional functionality such as, for example, anti-reflection functionality, anti-static functionality, anti-fog functionality, scratch resistance, mechanical durability, hydrophobic functionality, reflective functionality, darkening functionality, aesthetic functionality including tinting, or any combination of these.

Accordingly various embodiments of the lens 1 can include a polarizing layer, one or more adhesive layers, a photochromic layer, an electrochromic layer, a photoelectrochomic layer, a hard coat, a flash mirror, a liquid-containing layer, an antireflection coating, a mirror coating, an interference stack, chroma enhancing dyes, an index-matching layer, a scratch resistant coating, a hydrophobic coating, an anti-static coating, chroma enhancement dyes, color enhancement elements, laser attenuation filters, trichoic filters, violet edge filter, UV filter, IR filter, glass layers, hybrid glass-plastic layers, anti-reflective coatings, contrast enhancement elements, a liquid-containing layer, a gel containing layer, a refractive index matching layer, thermal insulation layer, electrical insulation layer, electrical conducting layer, neutral density filter, other lens elements, or a combination of lens components.

Various embodiments of the lens 1 and its components including but not limited to second lens element 105, or lens element 120 can be mass-colored or tinted in a variety of ways. For example, in some embodiments, color can be deposited on the second lens element 105 or the lens element 120 using a vapor or liquid source. The color can coat the second lens element 105 or the lens element 120 or it can penetrate into the second lens element 105 or the lens element 120, and/or can be applied using a sublimation process. In some embodiments, color can be added to a material used to make the second lens element 105 or the lens element 120, such as adding powdered color or plastic pellets to material that is extruded, injection molded, cast, machined, or otherwise incorporated into the second lens element 105 or the lens element 120. In some embodiments where liquids are used, the color can be added by a dip process. In such embodiments, a gradient tint or bi-gradient tint can be achieved through the dip process. In certain embodiments, a liquid coloring technique can be used to tint second lens element 105 or the lens element 120.

The disclosures in Italian Patent Application No. BO2013A000525 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

It is contemplated that the particular features, structures, or characteristics of any embodiments discussed herein can be combined in any suitable manner in one or more separate embodiments not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the laminates disclosed herein can be used in at least some lens configurations and/or optical systems besides lenses.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims.

What is claimed is:

1. Eyewear comprising:
 a lens comprising:
 a rear lens element facing an eye of a user when worn by the user having a first convex surface and a first concave surface, the rear lens element comprising photochromatic pigments configured to transition from a faded state to a darkened state when exposed to ultraviolet light; and
 an ultraviolet filter on the first concave surface of the rear lens element,
 wherein a percentage change of a luminous transmittance of the lens when switching between the faded state and the darkened state is greater than or equal to about 5%, wherein the luminous transmittance is defined by section 5.6.1 of ANSI Z80.3-2009 specification, and
 wherein a mean light transmittance of the lens in a wavelength range between about 200 nm and about 400 nm is less than 0.5%, and
 wherein the luminous transmittance of the lens over a wavelength range of about 380 nm to about 780 nm is greater than or equal to about 75% and less than or equal to about 99% when the photochromatic pigments are in the faded state.

2. The eyewear of claim 1, wherein the rear lens element comprises glass.

3. The eyewear of claim 1, wherein the rear lens element is colored.

4. The eyewear of claim 1, wherein a thickness of the rear lens element along an optical axis of the lens is between about 0.8 mm and about 1.2 mm.

5. The eyewear of claim 1, wherein the ultraviolet filter comprises a coating.

6. The eyewear of claim 1, wherein the rear lens element comprises an adhesive layer and wherein the photochromatic pigments of the rear lens element reside in the adhesive layer of the rear lens element.

7. The eyewear of claim 6, wherein a thickness of the adhesive layer along an optical axis of the lens is between about 10 μm and about 100 μm.

8. The eyewear of claim 6, wherein the mean light transmittance of the adhesive layer in a wavelength range between about 380 nm and about 780 nm is less than about 65% when the photochromatic pigments are in the darkened state.

9. The eyewear of claim 6, wherein the lens further comprises a front lens element toward an item to be viewed when worn by the user, the front lens element having a second convex surface and a second concave surface and
 wherein the first convex surface of the rear lens element comprises the adhesive layer and faces the second concave surface of the front lens element.

10. The eyewear of claim 9, wherein the rear lens element or the front lens element comprises glass.

11. The eyewear of claim 9, wherein the rear lens element is colored.

12. The eyewear of claim 9, wherein a thickness of the rear lens element or the front lens element along an optical axis of the lens is between about 0.8 mm and about 1.2 mm.

13. The eyewear of claim 1, wherein a CIE x-chromaticity of the lens is between 0.32 and 0.41 and a CIE y-chromaticity of the lens is between 0.36 and 0.44 when the photochromatic pigments are in the faded state, and wherein the CIE x-chromaticity of the lens is between 0.38 and 0.40 and the CIE y-chromaticity of the lens is between 0.36 and 0.42 when the photochromatic pigments are in the darkened state.

14. The eyewear of claim 1, wherein the percentage change of the luminous transmittance is greater than or equal to about 10%.

15. The eyewear of claim 1, wherein the luminous transmittance of the lens is greater than or equal to about 77% and less than or equal to about 90% when the photochromatic pigments are in the faded state.

16. The eyewear of claim 1, wherein the luminous transmittance of the lens is greater than or equal to about 80% and less than or equal to about 95% when the photochromatic pigments are in the faded state.

17. The eyewear of claim 1, wherein the luminous transmittance of the lens is greater than or equal to about 8% and less than or equal to about 88% when the photochromatic pigments are in the darkened state.

18. The eyewear of claim 1, wherein the luminous transmittance of the lens is greater than or equal to about 15% and less than or equal to about 60% when the photochromatic pigments are in the darkened state.

19. The eyewear of claim 1, wherein a mean transmittance of the rear lens element in the wavelength range from about 200 nm to about 400 nm is greater than or equal to about 50%.

20. The eyewear of claim 1, wherein a mean transmittance of the rear lens element in the wavelength range from about 200 nm to about 400 nm is greater than or equal to about 75%.

* * * * *

UNITED STATES PATENT AND TRADEMARK OFFICE
CERTIFICATE OF CORRECTION

PATENT NO. : 12,124,116 B2
APPLICATION NO. : 15/789684
DATED : October 22, 2024
INVENTOR(S) : Grasso Page 1 of 1

It is certified that error appears in the above-identified patent and that said Letters Patent is hereby corrected as shown below:

In the Specification

In Column 19, Lines 64-65, delete "photoelectrochomic" and insert -- photoelectrochromic --, therefor.

In the Claims

In Column 21, Claim 1, Line 2, delete "Eyewear" and insert -- An eyewear --, therefor.

Signed and Sealed this
Twenty-first Day of January, 2025

Coke Morgan Stewart
*Acting Director of the United States Patent and Trademark Office*